Warren A. Alexander INVENTOR.

Oct. 25, 1966 W. A. ALEXANDER 3,281,774
SYSTEM FOR THE AUDIBLE DETECTION OF SEISMIC EVENTS
Filed Aug. 6, 1962 2 Sheets-Sheet 2

Warren A. Alexander INVENTOR.

BY James E. Reed
ATTORNEY

United States Patent Office 3,281,774
Patented Oct. 25, 1966

3,281,774
SYSTEM FOR THE AUDIBLE DETECTION OF SEISMIC EVENTS
Warren A. Alexander, Tulsa, Okla., assignor, by mesne assignments, to Esso Production Research Company, Houston, Tex., a corporation of Delaware
Filed Aug. 6, 1962, Ser. No. 215,054
9 Claims. (Cl. 340—15.5)

The present invention relates to seismic prospecting and is particularly concerned with an improved method and apparatus for distinguishing seismic events from noise.

The reflection quality obtained during seismic prospecting operations varies greatly with geographical area. In some areas, reflection quality is high and hence trained seismic interpreters have little difficulty in analyzing and interpreting seismic records. In others, the quality is poor and interpretation is difficult or impossible. These variations are largely due to differences in the amount of "noise" generated in the near surface layers underlying the various areas. Random waves, horizontal waves traveling near the surface, and multiple reflections from shallow interfaces having high reflection coefficients all give rise to changes in the amplitude of the signal reaching the surface. These changes, referred to as noise, tend to distort and obscure changes in amplitude due to the arrival of energy reflected from subsurface discontinuities of interest. Where the signal-to-noise ratio is less than about 1:2, the interpreter is generally unable to distinguish seismic events by visually examining a record of the signal and hence indications of subsurface structures may not be detected. Attempts to reduce the noise and thus obtain better signal-to-noise ratios by means of specialized impulse sources, multiple geophone arrangements, and improved filtering techniques have been only partially successful. The development of better recording and correlation equipment in recent years has not eliminated interpretation problems. Despite the improvements which have been made, there are still many areas where seismic prospecting methods cannot be effectively employed because of poor signal-to-noise ratios.

It is therefore an object of the present invention to provide an improved system for the interpretation and analysis of seismic data. Another object is to provide a means for detecting significant events in seismic signals obtained in areas characterized by poor signal-to-noise ratios. A further object is to provide a method and apparatus for distinguishing reflections representing subsurface discontinuities from noise on multiple trace seismic records. Still other objects will become apparent as the invention is described in detail hereafter.

In accordance with the invention, it has now been found that events representing deep reflections can often be distinguished from noise in seismic signals by repeatedly scanning the signals over short intervals at rates within the audible frequency range and thereafter reproducing the resultant signals as audible waves. The existence of an event within the scanned interval results in the production of an audible wave having a tone which depends on the scanning frequency. This tone can often be detected audibly even though the noise present would normally prevent detection of the seismic event by visual examination of the recorded signal. By scanning two traces of a seismic record and producing two audible waves simultaneously, the same event can generally be identified in both signals and thus a correlation of the traces can be effected. The invention thus facilitates the interpretation and analysis of seismic information and may permit the effective use of seismic prospecting methods in areas where such methods could not otherwise be employed.

The method of the invention is preferably carried out by repeatedly scanning a seismic signal over a short interval at a rate between about 50 and about 1,000 times per second. The scanning rate selected will depend somewhat, however, upon the characteristics of the signal and the preference of the seismic interpreter. The ability to discern tones in the presence of noise varies somewhat with different individuals and hence scanning rates outside the preferred range may at times be utilized. The signal interval scanned will normally range from about 0.05 to about 0.2 second, again depending upon the signal characteristics and preference of the interpreter. It is often desirable to vary the scanning rate and interval until a tone indicative of the presence of a seismic event can be detected and thereafter to utilize the rate and interval thus selected for interpretation and analysis of the entire signal. In some cases, however, the use of different rates and intervals for scanning different parts of the signal may be preferable.

The scanning system employed will depend upon the form in which the seismic signal to be interpreted is recorded. Optical scanners suitable for use with films or prints containing variable density, variable area or similar traces will be utilized in most cases but in some instances scanning devices suitable for use with signals recorded on magnetic tape may be employed. Regardless of the particular system used, an electrical signal having a frequency within the audible range is obtained. This signal is amplified and then converted into an audible wave by means of an earphone, loudspeaker or similar device. The amplifier output may be amplitude or frequency modulated prior to generation of the audible wave in order to further improve the ability of the ear to distinguish seismic events from noise. Frequency modulation is particularly effective because the ear is highly sensitive to frequency changes and because it permits wide variations in the scanning rate. The use of a modulation step is not essential, however, and may therefore be omitted if desired. Binaural earphones may be used where two signals are scanned simultaneously.

The exact nature and objects of the invention can best be understood by referring to the following detailed description of a preferred embodiment and to the accompanying drawing, in which.

Figure 1:
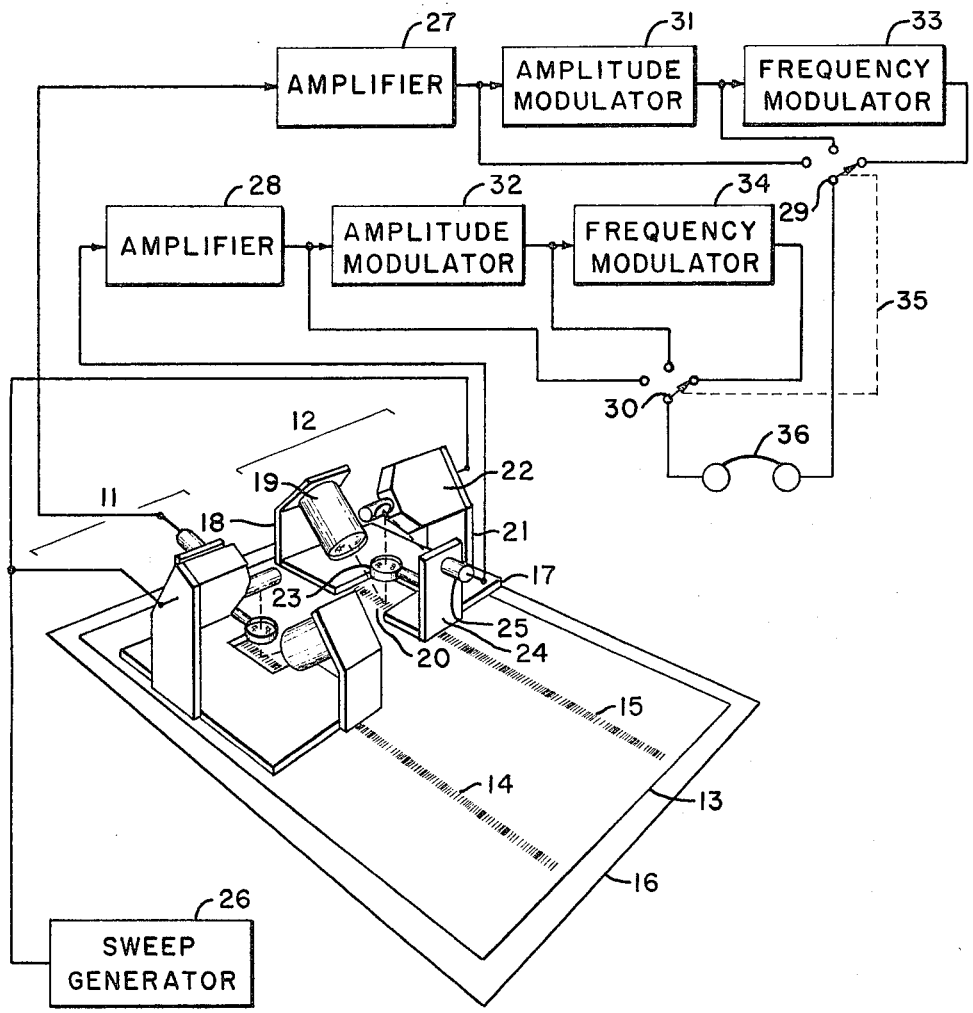
FIGURE 1 is a schematic diagram of apparatus useful for detecting significant events on seismic records in accordance with the invention.

The apparatus depicted in FIGURE 1 includes scanning devices 11 and 12 which are positioned on a photographic print 13 of a seismic record containing variable density traces 14 and 15. Although only two traces are shown for purposes of illustration, the record will normally contain 12 or more individual traces closely spaced with respect to one another. The print and scanning devices are supported on a table or platform 16. The two scanning devices are identical. Each includes a base 17, a light support 18 extending upwardly from the base, and a light source 19 mounted on the support. The light source may be a conventional incandescent bulb mounted within a housing fitted with a focusing lens. The source is positioned to permit the direction of a bright spot of light on the record within a cutout section 20 in the base of the scanning device. A galvanometer support 21 is affixed to the base and supports a reflecting mirror galvanometer 22. The galvanometer is located above the cutout section so that light reflected from the seismic record will impinge on the galvanometer mirror. The axis of rotation of the mirror extends at right angles to the traces on the seismic record. A lens 23 is positioned between the trace and mirror to focus light from the trace onto the mirror. The focusing lens is mounted on photocell support 24 affixed to the base. A photoelectric cell or similar photosensitive transducer 25 is mounted on the support in a position such that light reflected from the galvanometer mirror will fall thereon.

The reflecting mirror galvanometers in the scanning units shown in FIGURE 1 are actuated by an electrical signal from an external sweep generator 26. The sweep generator may be a conventional function generator designed to produce a sawtooth waveform, a sine wave, a triangular waveform or simliar sweep signal. The generator output causes the galvanometer mirrors to oscillate at a frequency equivalent to that of the signal. This determines the scanning rate. In utilizing a system of this type, it is preferred to employ scanning rates between about 50 and about 1,000 times per second and hence the generator frequency will normally range between about 50 and about 1,000 cycles per second. Frequencies outside this range may be utilized, however. The amplitude of the sweep generator signal is selected so that the galvanometer mirror will be deflected through a distance sufficient to sweep an interval between about 0.05 and about 0.2 second on the seismic trace. Since the deflection of the mirror is proportional to the amplitude of the generator signal, the record interval scanned can readily be controlled.

The electrical signals generated by the photoelectric cells 25 in response to light impinging on the cells are fed to amplifiers 27 and 28. The amplifiers are of conventional design and serve to increase the photocell output voltage to a usable level. The output signals from the amplifiers are fed to selector switches 29 and 30 and to amplitude modulators 31 and 32. Frequency modulators 33 and 34 are connected in series with the amplitude modulators in the apparatus shown. Each modulator is connected to terminals of the selector switches 29 and 30. Output signals from the amplifiers, from the amplitude modulation circuit, or from the frequency modulation circuit can thus be utilized. If desired, the frequency modulation circuit may be connected directly to the amplifier rather than being connected through the amplitude modulation circuit as shown. The selector switches are preferably interconnected mechanically as indicated by dotted line 35 in the drawing so that they operate in unison. The output signals from the selector switches are fed to binaural earphones 36. Each earphone converts the information scanned by one of the scanning units into an audible wave.

In utilizing the apparatus shown in FIGURE 1 of the drawing, the interpreter first positions the scanning units on the seismic record to be scanned. The position of each unit is adjusted so that light from the light source thereon will fall upon the trace of interest. The light sources and galvanometers are then energized. As each galvanometer oscillates in response to the sweep generator signal, a short interval on each trace is scanned repeatedly. This results in the generation of electrical signals in the photoelectric cells. These signals are amplified and fed to the binaural earphones. Each earphone produces a steady tone in response to a seismic event present in the trace interval scanned. By listening to these tones and moving the scanning units along the traces until each earphone produces the same tone, the interpreter is able to detect corresponding seismic events on the two traces. A seismic profile can thus be prepared. Because of the sensitivity of the ear to sustained tones in the presence of noise, signals which might otherwise be overlooked in the presence of noise can thus be detected.

The apparatus described in the preceding paragraphs is intended to permit the scanning of two signals simultaneously. In many cases, however, it is preferred to scan only one signal at a time. In such instances, only one scanning unit and its associated components will be used. By listening to the audible signal produced by scanning a short interval of a single trace, a tone indicating the presence of a seismic event can often be detected despite a high noise level.

Figure 2:
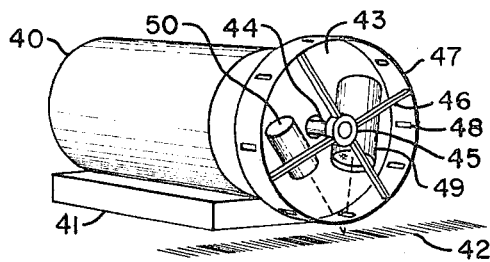
FIGURE 2 depicts an alternate form of scanning device.

FIGURE 2 of the drawing depicts a further embodiment of the invention suitable for the scanning of variable area, variable density, or stacked amplitude traces on a seismic record printed on photographic paper. The apparatus of FIGURE 2 comprises a fractional horsepower electrical motor 40 mounted upon a base 41 which can be moved over the record 42 as desired. Any of a variety of small variable speed motors may be employed. If two traces are to be scanned simultaneously, it is preferred to employ synchronous motors so that they can be operated in phase. A variable speed oscillator can be employed to drive the synchronous motors and control their speed. A circular plate 43 is connected to the motor housing in fixed position. The plate is mounted in a plane perpendicular to the longitudinal axis of the motor. The motor shaft 44 extends through an opening near the center of the plate. Attached to the shaft is a rotating aperture assembly consisting of a hub 45, supporting arms 46 extending outwardly from the hub, and an annular sleeve 47 to which the outer ends of the supporting arms are connected. The sleeve contains slits 48 which are spaced at regular intervals about its circumference. The length of each slit is equivalent to the width of a trace on the record to be scanned. Each slit will normally be from about $\frac{1}{64}$ to about $\frac{1}{4}$ inch in width. The number of slits provided will depend upon the motor speed and the scanning rate desired. A sleeve containing four slits rotated at a speed of 3600 revolutions per minute, for example, will give a scanning rate of 240 times per second. In like manner, a sleeve containing eight slits will permit scanning at 480 times per second at a motor speed of 3600 revolutions per minute. A light source 49 including a bulb, housing and focusing lens is mounted on plate 43 to direct light toward the record on which the scanning assembly is positioned. The light passes through the slits in the sleeve as the sleeve is rotated. Light reflected from the record passes through the slits to a photoelectric cell 50 mounted on plate 43. It will be apparent that the light source and photoelectric cell must be mounted on the plate so that light can readily pass to and from the record through the slits as the sleeve rotates. The inner surface of the sleeve will preferably be provided with a dull black finish to prevent the reflection of light from the sleeve to the photoelectric cell.

Figure 3:
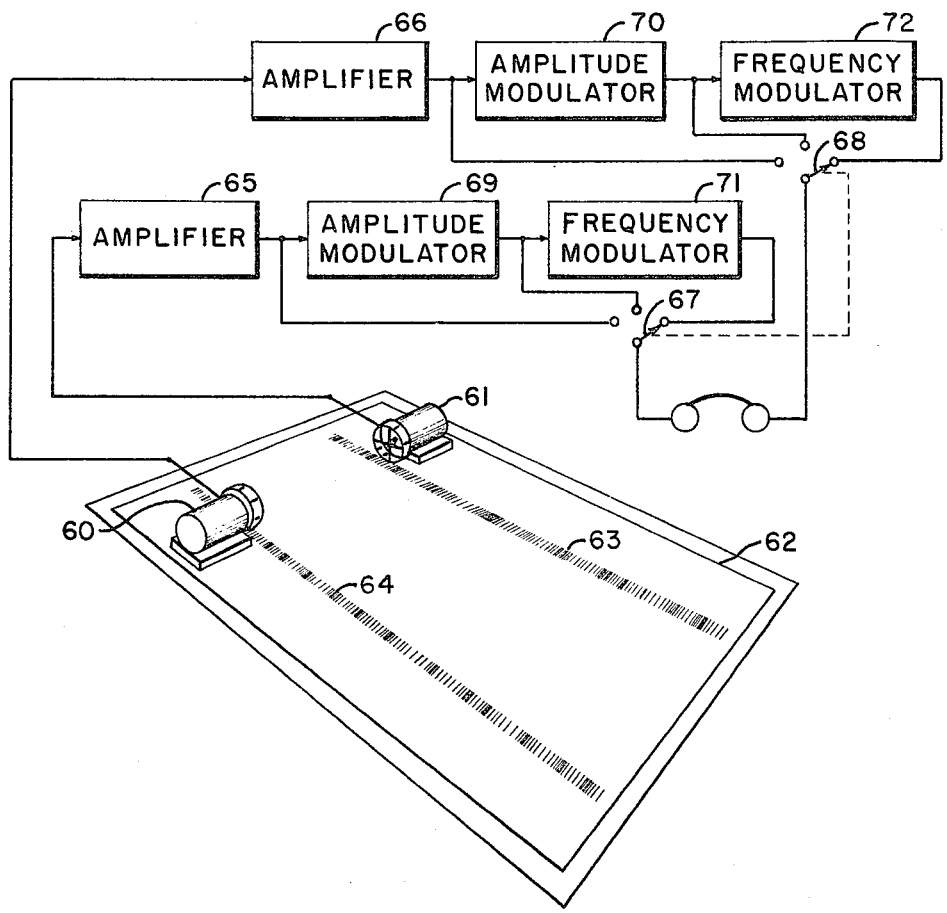
FIGURE 3 shows schematically apparatus including the scanning device of FIGURE 2 for practicing the invention.

Apparatus including two scanning units of the type described in the preceding paragraph is shown in FIGURE 3 of the drawing. As in the earlier embodiment, the scanning unit, designated by reference numerals 60 and 61, are positioned on an opaque print of a seismic record 62 including traces 63 and 64. Again only two traces are shown but it will be understood that the record will normally contain many traces closely spaced with respect to one another. The electrical signals generated by the photoelectric cells in the scanning units are fed to amplifiers 65 and 66. The output signals from the amplifiers are in turn fed to selector switches 67 and 68. Amplitude modulation units 69 and 70 and frequency modulation units 71 and 72 are also connected to the amplifiers and terminals of the selector switches to permit modulation of the amplifier output signals if desired. Binaural earphones or similar devices are connected to the output terminals of the selector switches to permit independent conversion of the two electrical signals into audible waves.

The apparatus shown in FIGURE 3 of the drawing can be used in a manner similar to that described in connection with the earlier embodiment. A single scanning unit and its associated components can be used to scan a single trace on the record and reproduce an audible signal in which the presence of a seimic event is evidenced by the production of a characteristic tone. Alternatively, both scanning units may be positioned on the seismic record so that two different traces may be scanned simultaneously. The units can then be energized so that the interpreter can listen to the audible waves produced. The presence of a seismic event in the record interval scanned results in the production of a steady tone in one or both of the audible waves. By moving the scanning units along the traces until the audible waves match one another, the interpreter can thus identify events extending across the record. Either method may permit interpretation of the record even though the signal-to-noise ratio may be so poor that interpretation by other means would be difficult or impossible.

The invention has been described above in connection with the scanning of seismic signals recorded on photographic prints. It will be apparent, however, that the apparatus shown can also be employed for scanning translucent or film-type records. With the apparatus of FIGURE 1 for example, translucent records can be scanned by placing the record on a glass surface illuminated from below and utilizing the light transmitted through the record for scanning purposes. The galvanometer mirror will reflect the transmitted light to the photoelectric cell to produce the requisite electrical signal and hence the light source shown can be dispensed with. Similarly, the use of a light source as shown in the apparatus of FIGURE 2 is unnecessary if a film-type record illuminated from below is to be scanned. Light transmitted through the record will pass through the slits as the sleeve rotates and activate the photoelectric cell to produce the electrical signals. It may be necessary to adjust the position of the cell slightly when the apparatus is used in this manner. In lieu of utilizing a source of light positioned beneath the film, the record may be mounted on an aluminum or similar reflecting surface and scanned with incident light from a source above the film as shown in FIGURES 1 and 2. Flying spot scanners or similar cathode ray tube scanning devices well known to those skilled in the art may also be used for scanning purposes.

What is claimed is:

1. A method for distinguishing seismic events from noise in a seismic signal which comprises repeatedly scanning an interval of said signal corresponding to from about 0.05 to about 0.2 second of signal time at a repetition rate within the audible frequency range to produce an electrical signal and thereafter generating an audible signal corresponding to said electrical signal.

2. A method as defined by claim 1 wherein said seismic signal is scanned with a repetition rate between about 50 and about 1,000 times per second.

3. A method for distinguishing seismic events from noise in a seismic signal which comprises repeatedly scanning an interval of said signal equivalent to from about 0.05 to about 0.2 second of signal time at a repetition rate between about 50 and about 1,000 times per second to produce an electrical signal having a frequency in the audible range, modulating said signal, and thereafter generating an audible signal corresponding to the modulated electrical signal.

4. A method as defined by claim 3 wherein said electrical signal is amplitude modulated.

5. A method as defined by claim 3 wherein said electrical signal is frequency modulated.

6. Apparatus for detecting seismic events on a seismic record which comprises a motor having a rotatable shaft, a slotted sleeve mounted on the shaft of said motor in a plane transverse to the longitudinal axis of said shaft, the slots in said sleeve extending parallel to said shaft, a light source positioned to direct light through the slots in said sleeve onto a seismic record as said shaft rotates, a photosensitive transducer positioned to receive light through the slots in said sleeve from said seismic record as said shaft rotates, means for amplifying the output signal from said transducer, and means for generating an audible signal in response to an output signal from said amplifying means.

7. A method for detecting seismic events on a seismic record which comprises repeatedly scanning portions of two traces on said record with a repetition rate in the audible frequency range to produce two electrical signals, converting said electrical signals into simultaneous audible signals, and thereafter varying the portions of said traces scanned until said audible signals match one another.

8. A method for correlating traces of a seismic record which comprises repeatedly scanning an interval equivalent to from about 0.05 to about 0.2 second on each of two separate traces at a repetition rate within the audible frequency range to produce two electrical signals, generating simultaneous audible signals corresponding to said electrical signals, and varying the position of the interval scanned on at least one of said traces until said audible signals match one another.

9. A method for correlating traces of a seismic record which comprises optically scanning an interval equivalent to from about 0.05 to about 0.2 second on each of two separate traces at a rate between about 50 and about 1,000 times per second, generating electrical signals having frequencies in the audible range in response to the repeated scanning of said intervals on said traces, frequency modulating said electrical signals, generating simultaneous audible signals corresponding to the frequency modulated signals, and thereafter varying the position of the interval scanned on at least one of said traces until said audible signals contain matching tones.

References Cited by the Examiner

UNITED STATES PATENTS

| | | | |
|---|---|---|---|
| 2,228,782 | 1/1941 | Sharples | 250—219.1 |
| 2,267,356 | 12/1941 | Ritzmann | 340—15.5 |
| 2,287,965 | 6/1942 | Borberg | 250—219.1 |
| 2,408,029 | 9/1946 | Bazzoni et al. | 250—219.1 |
| 2,707,524 | 4/1955 | Montgomery | 340—15.5 X |
| 2,726,131 | 12/1955 | Skelton | 340—15.5 |
| 2,932,016 | 4/1960 | Dayonnet et al. | 250—219.1 |
| 3,006,713 | 10/1961 | Klein et al. | 340—15.5 |
| 3,072,889 | 1/1963 | Willcox | 346—109 X |

BENJAMIN A. BORCHELT, *Primary Examiner.*

CHESTER L. JUSTUS, SAMUEL FEINBERG,
*Examiners.*

R. M. SKOLNIK, W. KUJAWA, *Assistant Examiners.*